(12) United States Patent
Gulevich et al.

(10) Patent No.: US 7,544,748 B2
(45) Date of Patent: Jun. 9, 2009

(54) COMPONENTS AND CATALYSIS FOR THE POLYMERIZATION OF OLEFINS

(75) Inventors: Yuri Gulevich, Ferrara (IT); Giulio Balbontin, Savona (IT); Giampiero Morini, Padova (IT); Ilya Nifant'ev, Moscow (RU)

(73) Assignee: Basell Poliolefine Italia S.r.l., Milan (IT)

( * ) Notice: Subject to any disclaimer, the term of this patent is extended or adjusted under 35 U.S.C. 154(b) by 0 days.

(21) Appl. No.: 11/547,111

(22) PCT Filed: Mar. 8, 2005

(86) PCT No.: PCT/EP2005/002476

§ 371 (c)(1),
(2), (4) Date: Oct. 2, 2006

(87) PCT Pub. No.: WO2005/097841

PCT Pub. Date: Oct. 20, 2005

(65) Prior Publication Data

US 2007/0208150 A1  Sep. 6, 2007

Related U.S. Application Data

(60) Provisional application No. 60/560,107, filed on Apr. 7, 2004.

(30) Foreign Application Priority Data

Apr. 2, 2004 (EP) .................................. 04101385

(51) Int. Cl.
*C08F 4/642* (2006.01)

(52) U.S. Cl. .................. 526/124.9; 502/115; 502/126; 502/127; 502/132

(58) Field of Classification Search ............... 526/124.9; 502/115, 127, 124.6, 126
See application file for complete search history.

(56) References Cited

U.S. PATENT DOCUMENTS

| 4,220,554 | A | 9/1980 | Scata et al. |
| 4,298,718 | A | 11/1981 | Mayr et al. |
| 4,399,054 | A | 8/1983 | Ferraris et al. |
| 4,469,648 | A | 9/1984 | Ferraris et al. |
| 4,495,338 | A | 1/1985 | Mayr et al. |
| 5,049,533 | A | 9/1991 | Nakajo et al. |

FOREIGN PATENT DOCUMENTS

| EP | 395083 | 10/1990 |
| EP | 553805 | 8/1993 |
| EP | 553806 | 8/1993 |
| EP | 601525 | 6/1994 |
| EP | 704424 | 4/1996 |
| JP | 46027182 | 8/1971 |
| JP | 10195126 | 7/1998 |
| WO | 1998/44001 | 10/1998 |

*Primary Examiner*—Caixia Lu
(74) *Attorney, Agent, or Firm*—Jarrod N. Raphael

(57) ABSTRACT

The present invention relates to a solid catalyst component for the polymerization of olefins $CH_2=CHR$ in which R is hydrogen or a hydrocarbon radical with 1-12 carbon atoms, comprising Mg, Ti, halogen and an electron donor selected from β-keto-ester derivatives of a particular formula. Said catalyst components when used in the polymerization of olefins, and in particular of propylene, are capable to give polymers in high yields and with high isotactic index expressed in terms of high xylene insolubility.

14 Claims, No Drawings

COMPONENTS AND CATALYSIS FOR THE POLYMERIZATION OF OLEFINS

The present invention relates to catalyst components for the polymerization of olefins, to the catalyst obtained therefrom and to the use of said catalysts in the polymerization of olefins. In particular the present invention relates to catalyst components, suitable for the stereospecific polymerization of olefins, comprising Ti, Mg, halogen and an electron donor compound selected from specific β-keto-ester derivatives. Said catalyst components when used in the polymerization of olefins, and in particular of propylene, are capable to give polymers in high yields and with high isotactic index expressed in terms of high xylene insolubility.

The use of some keto-ester derivatives as electron donor compounds for the preparation of olefin polymerization catalysts is known in the art. U.S. Pat. No. 5,049,533, for example, describes titanium and magnesium based catalyst components containing an electron donor compound selected from keto-esters of formula $R^1$—CO-Z-COO$R^2$ where $R^1$, $R^2$, and Z are broadly defined. In particular, the preferred keto-esters are those in which Z is a divalent aromatic or polycyclic hydrocarbon having from 6 to 20 carbon atoms. In all the working examples, γ-keto-esters are used. The stereoregularity of the polypropylene obtained, measured by the boiling heptane insolubility, is not particularly high and also the polymerization activities are not fully satisfactory.

It has been therefore very surprising to discover that the use of certain β-keto-esters derivatives, specifically substituted, gives catalyst components having an increased activity and stereospecificity with respect to the catalyst components containing the β-keto-ester derivatives of the prior art.

It is therefore an object of the present invention to provide a solid catalyst component for the polymerization of olefins $CH_2$=CHR in which R is hydrogen or a hydrocarbon radical with 1-12 carbon atoms, comprising Mg, Ti, halogen and an electron donor selected from certain β-keto-ester derivatives of formula (I)

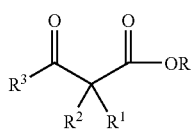

(I)

wherein the groups R and $R^3$ are, same or different, a C1-C20 hydrocarbon group optionally containing heteroatoms, and the groups $R^1$ and $R^2$ are H or a C1-C20 hydrocarbon group optionally containing heteroatoms, with the proviso that they are not contemporaneously hydrogen, and two or more of the groups R-$R^3$ can be linked to form a cycle.

Good results in terms of activity and stereospecificity and/or their balance can be obtained using compounds falling within the entire scope of the formula (I) above. In particular, interesting results can be obtained either in the case one of $R^1$ and $R^2$ is hydrogen or in the case both of them are hydrocarbon groups.

R is preferably a primary alkyl having from 1 to 15 carbon atoms and especially from 1 to 10 carbon atoms. Particularly preferred groups are methyl, ethyl isobutyl, isopentyl, neopentyl, 2-methyl-butyl, 2-ethyl-butyl and 2-ethyl-hexyl. The groups $R^1$ are preferably selected from linear or branched alkyl groups that can be primary, secondary or tertiary.

The groups $R^3$ are preferably selected from aryl or linear or branched alkyl groups that can be primary, secondary or tertiary. The groups $R^2$ are preferably selected from hydrogen or linear or branched alkyl groups that can be primary, secondary or tertiary.

Specific examples of useful β-keto-ester derivatives are ethyl 2-propyl-3-butyl-3-oxo-propionate, ethyl 2-methyl-2-ethyl-3-methyl-3-oxo-propionate, ethyl 2,2-di-ethyl-3-methyl-3-oxo-propionate, ethyl 2,2-di-ethyl-3-ethyl-3-oxo-propionate, ethyl 2-propyl-2-isobutyl-3-butyl-3-oxo-propionate, ethyl 2-propyl-2-cyclopentyl-3-butyl-3-oxo-propionate, ethyl 2-butyl-2-cyclopentyl-3-methyl-3-oxo-propionate, ethyl 2,2-di-isobutyl-3-methyl-3-oxo-propionate, ethyl 2-isopropyl-3-isobutyl-3-oxo-propionate, ethyl 2,2-di-ethyl-3-isobutyl-3-oxo-propionate, ethyl 2-butyl-2-isopropyl-3-isobutyl-3-oxo-propionate, ethyl 2,2-di-isobutyl-3-isopentyl-3-oxo-propionate, ethyl 2-isobutyl-2-isopropyl-3-isobutyl-3-oxo-propionate, ethyl 2,2-di-ethyl-3-cyclohexyl-3-oxo-propionate, ethyl 3-phenyl-3-oxo-propionate, ethyl 3-tert-butyl-3-oxo-propionate, ethyl 2-methyl-3-tert-butyl-3-oxo-propionate, ethyl 2-butyl-3-tert-butyl-3-oxo-propionate, ethyl 2-(cyclohexyl-methyl)-3-tert-butyl-3-oxo-propionate, ethyl 2-(trimethylsilyl-methyl)-3-tert-butyl-3-oxo-propionate, ethyl 2-(triethylsilyl-methyl)-3-tert-butyl-3-oxo-propionate, ethyl 2-isopropyl-3-tert-butyl-3-oxo-propionate, ethyl 2,2-di-ethyl-3-tert-butyl-3-oxo-propionate, ethyl 2,2-di-propyl-3-tert-butyl-3-oxo-propionate, ethyl 2-butyl-2-isobutyl-3-tert-butyl-3-oxo-propionate, ethyl 2,2-di-isobutyl-3-tert-butyl-3-oxo-propionate, ethyl 2,2-penta-methylene-3-methyl-3-oxo-propionate, ethyl 2,2-penta-methylene-3-tert-butyl-3-oxo-propionate, ethyl 1,3,3-tri-methyl-2-oxo-cyclohexanoate and the corresponding methyl, isobutyl and neopentyl esters.

Among them, preferred are ethyl 2,2-di-ethyl-3-ethyl-3-oxo-propionate, ethyl 2-butyl-2-cyclopentyl-3-methyl-3-oxo-propionate, ethyl 2,2-di-isobutyl-3-methyl-3-oxo-propionate, ethyl 2,2-di-ethyl-3-isobutyl-3-oxo-propionate, ethyl 2-butyl-3-tert-butyl-3-oxo-propionate, ethyl 2-isopropyl-3-tert-butyl-3-oxo-propionate and the corresponding methyl, isobutyl and neo-pentyl esters.

As explained above, the catalyst components of the invention comprise, in addition to the above electron donors, Ti, Mg and halogen. In particular, the catalyst components comprise a titanium compound, having at least a Ti-halogen bond and the above mentioned electron donor compound supported on a Mg halide. The magnesium halide is preferably $MgCl_2$ in active form, which is widely known from the patent literature as a support for Ziegler-Natta catalysts. Patents U.S. Pat. No. 4,298,718 and U.S. Pat. No. 4,495,338 were the first to describe the use of these compounds in Ziegler-Natta catalysis. It is known from these patents that the magnesium dihalides in active form used as support or co-support in components of catalysts for the polymerization of olefins are characterized by X-ray spectra, in which the most intense diffraction line that appears in the spectrum of the non-active halide is diminished in intensity and is replaced by a halo whose maximum intensity is displaced towards lower angles relative to that of the more intense line.

The preferred titanium compounds used in the catalyst components of the present invention are $TiCl_4$ and $TiCl_3$; furthermore, also Ti-haloalcoholates of formula $Ti(OR)_{n-y}X_y$, where n is the valence of titanium and y is a number between 1 and n, can be used.

The preparation of the solid catalyst component can be carried out according to several methods.

According to one of these methods, the magnesium dichloride in an anhydrous state and the β-keto-ester derivative are milled together under conditions in which activation of the magnesium dichloride occurs. The so obtained product can be treated one or more times with an excess of TiCl$_4$ at a temperature between 80 and 135° C. This treatment is followed by washings with hydrocarbon solvents until chloride ions disappear. According to a further method, the product obtained by co-milling the magnesium chloride in an anhydrous state, the titanium compound and the β-keto-ester derivative is treated with halogenated hydrocarbons such as 1,2-dichloroethane, chlorobenzene, dichloromethane, etc. The treatment is carried out for a time between 1 and 4 hours and at temperature of from 40° C. to the boiling point of the halogenated hydrocarbon. The product obtained is then generally washed with inert hydrocarbon solvents such as hexane.

According to another method, magnesium dichloride is preactivated according to well known methods and then treated at a temperature of about 80 to 135° C. with an excess of TiCl$_4$ which contains, in solution, a β-keto-ester derivative. The treatment with TiCl$_4$ is repeated and the solid is washed with hexane in order to eliminate any non-reacted TiCl$_4$.

A further method comprises the reaction between magnesium alcoholates or chloroalcoholates (in particular chloroalcoholates prepared according to U.S. Pat. No. 4,220,554) and an excess of TiCl$_4$ comprising the β-keto-ester derivative in solution at a temperature of about 80 to 120° C.

According to a preferred method, the solid catalyst component can be prepared by reacting a titanium compound of formula Ti(OR)$_{n-y}$X$_y$, where n is the valence of titanium and y is a number between 1 and n, preferably TiCl$_4$, with a magnesium chloride deriving from an adduct of formula MgCl$_2$.pROH, where p is a number between 0.1 and 6, preferably from 2 to 3.5, and R is a hydrocarbon radical having 1-18 carbon atoms. The adduct can be suitably prepared in spherical form by mixing alcohol and magnesium chloride in the presence of an inert hydrocarbon immiscible with the adduct, operating under stirring conditions at the melting temperature of the adduct (100-130° C.). Then, the emulsion is quickly quenched, thereby causing the solidification of the adduct in form of spherical particles. Examples of spherical adducts prepared according to this procedure are described in U.S. Pat. No. 4,399,054 and U.S. Pat. No. 4,469,648. The so obtained adduct can be directly reacted with the Ti compound or it can be previously subjected to thermal controlled dealcoholation (80-130° C.) so as to obtain an adduct in which the number of moles of alcohol is generally lower than 3, preferably between 0.1 and 2.5. The reaction with the Ti compound can be carried out by suspending the adduct (dealcoholated or as such) in cold TiCl$_4$ (generally 0° C.); the mixture is heated up to 80-130° C. and kept at this temperature for 0.5-2 hours. The treatment with TiCl$_4$ can be carried out one or more times. The β-keto-ester derivative can be added during the treatment with TiCl$_4$. The treatment with the electron donor compound can be repeated one or more times.

The preparation of catalyst components in spherical form is described for example in European Patent Applications EP-A-395083, EP-A-553805, EP-A-553806, EPA-601525 and WO98/44001.

The solid catalyst components obtained according to the above method show a surface area (by B.E.T. method) generally between 20 and 500 m$^2$/g and preferably between 50 and 400 m$^2$/g, and a total porosity (by B.E.T. method) higher than 0.2 cm$^3$/g preferably between 0.2 and 0.6 cm$^3$/g. The porosity (Hg method) due to pores with radius up to 10.000 Å generally ranges from 0.3 to 1.5 cm$^3$/g, preferably from 0.45 to 1 cm$^3$/g.

A further method to prepare the solid catalyst component of the invention comprises halogenating magnesium dihydrocarbyloxide compounds, such as magnesium dialkoxide or diaryloxide, with solution of TiCl$_4$ in aromatic hydrocarbon (such as toluene, xylene etc.) at temperatures between 80 and 130° C. The treatment with TiCl$_4$ in aromatic hydrocarbon solution can be repeated one or more times, and the β-keto-ester derivative is added during one or more of these treatments.

In any of these preparation methods the desired β-keto-ester derivative can be added as such or, in an alternative way, it can be obtained in situ by using an appropriate precursor capable to be transformed in the desired electron donor compound by means, for example, of known chemical reactions such as esterification, trans-esterification, etc. Generally the β-keto-ester derivative is used for the preparation of the catalyst component in molar ratio with respect to the MgCl$_2$ of from 0.01 to 1 preferably from 0.05 to 0.5.

The solid catalyst components according to the present invention are converted into catalysts for the polymerization of olefins by reacting them with organoaluminum compounds according to known methods.

In particular, it is an object of the present invention a catalyst for the polymerization of olefins CH$_2$=CHR, in which R is hydrogen or a hydrocarbonyl radical with 1-12 carbon atoms, comprising the product of the reaction between:

(a) a solid catalyst component comprising a Mg, Ti and halogen and an electron donor selected from β-keto-ester derivatives of formula (I)

wherein the groups R and R$^3$ are, same or different, a C1-C20 hydrocarbon group optionally containing heteroatoms, R$^1$ and R$^2$ are H or a C1-C20 hydrocarbon group optionally containing heteroatoms, with the proviso that they are not contemporaneously hydrogen, and two or more of the groups R-R$^3$ can be linked to form a cycle;

(b) an alkylaluminum compound and, optionally, (c) one or more electron-donor compounds (external donor).

The alkyl-Al compound (b) is preferably selected from the trialkylaluminum compounds such as, for example, triethylaluminum, triisobutylaluminum, tri-n-butylaluminum, tri-n-hexylaluminum and tri-n-octylaluminum. It is also possible to use mixtures of trialkylaluminum's with alkylaluminum halides, alkylaluminum hydrides or alkylaluminum sesquichlorides such as AlEt$_2$Cl and Al$_2$Et$_3$Cl$_3$.

The external donor (c) can be of the same type or it can be different from the β-keto-ester derivative. Suitable external electron-donor compounds include silicon compounds, ethers, esters such as ethyl 4-ethoxybenzoate, amines, heterocyclic compounds and particularly 2,2,6,6-tetramethyl piperidine, ketones and the 1,3-diethers of the general formula (II):

wherein $R^I$, $R^{II}$, $R^{III}$, $R^{IV}$, $R^V$ and $R^{VI}$ equal or different to each other, are hydrogen or hydrocarbon radicals having from 1 to 18 carbon atoms, and $R^{VII}$ and $R^{VIII}$, equal or different from each other, have the same meaning of $R^I$-$R^{VI}$ except that they cannot be hydrogen; one or more of the $R^I$-$R^{VIII}$ groups can be linked to form a cycle. Particularly preferred are the 1,3-diethers in which $R^{VII}$ and $R^{VIII}$ are selected from $C_1$-$C_4$ alkyl radicals.

Another class of preferred external donor compounds is that of silicon compounds of formula $R_a^5 R_b^6 Si(OR^7)_c$, where a and b are integer from 0 to 2, c is an integer from 1 to 3 and the sum (a+b+c) is 4; $R^5$, $R^6$, and $R^7$, are alkyl, cycloalkyl or aryl radicals with 1-18 carbon atoms optionally containing heteroatoms. Particularly preferred are the silicon compounds in which a is 1, b is 1, c is 2, at least one of $R^5$ and $R^6$ is selected from branched alkyl, cycloalkyl or aryl groups with 3-10 carbon atoms optionally containing heteroatoms and $R^7$ is a $C_1$-$C_{10}$ alkyl group, in particular methyl. Examples of such preferred silicon compounds are methylcyclohexyldimethoxysilane, diphenyldimethoxysilane, methyl-tert-butyldimethoxysilane, dicyclopentyldimethoxysilane, 2-ethylpiperidinyl-2-tert-butyldimethoxysilane and 1,1,1-trifluoropropyl-2-ethylpiperidinyl-dimethoxysilane. Moreover, are also preferred the silicon compounds in which a is 0, c is 3, $R^6$ is a branched alkyl or cycloalkyl group, optionally containing heteroatoms, and $R^7$ is methyl. Examples of such preferred silicon compounds are cyclohexyltrimethoxysilane, tert-butyltrimethoxysilane and thexyltrimethoxysilane.

The electron donor compound (c) is used in an amount suitable to give a molar ratio between the organoaluminum compound and said electron donor compound (c) of from 0.1 to 500, preferably from 1 to 300 and more preferably from 3 to 100. As previously indicated, when used in the (co)polymerization of olefins, and in particular of propylene, the catalysts of the invention allow to obtain, with high yields, polymers having a high isotactic index (expressed by high xylene insolubility X.I.), thus showing an excellent balance of properties. This is particularly surprising in view of the fact that, as it can be seen from the comparative examples reported herebelow, the use as internal electron donors of the β-keto-ester compounds of the prior art gives worse results in term of yields and/or xylene insolubility. Moreover, the catalyst components of the invention are able to provide polymers with a wide range of molecular weight distribution (MWD) ranging from narrow-medium (expressed by values of PI lower than 4) to medium-broad (expressed by value of PI approaching 5).

Therefore, it constitutes a further object of the present invention a process for the (co)polymerization of olefins, carried out in the presence of a catalyst comprising the product of the reaction between:

(a) a solid catalyst component as defined above;
(b) an alkylaluminum compound and, optionally,
(c) one or more electron-donor compounds (external donor).

Preferred olefins to be (co)polymerized are the alpha olefins having from 2 to 12 carbon atoms. In particular, ethylene, propylene, butene-1, hexene-1 and octene-1. Among them ethylene, propylene, butene-1 and mixture thereof are especially preferred. The polymerization process can be carried out according to known techniques such as, for example, slurry polymerization using as diluent an inert hydrocarbon solvent or bulk polymerization using the liquid monomer (for example propylene) as a reaction medium. Moreover, it is possible to carry out the polymerization process in gas-phase operating in one or more fluidized or mechanically agitated bed reactors.

The polymerization is generally carried out at temperature of from 20 to 120° C., preferably of from 40 to 80° C. When the polymerization is carried out in gas-phase the operating pressure is generally between 0.5 and 10 MPa, preferably between 1 and 5 MPa. In the bulk polymerization the operating pressure is generally between 1 and 6 MPa preferably between 1.5 and 4 MPa. Hydrogen or other compounds capable to act as chain transfer agents can be used to control the molecular weight of polymer.

The following examples are given in order to better illustrate the invention without limiting it.

Characterizations

Preparation of β-Keto-Ester Derivatives

β-Keto-ester derivatives can be prepared according to the following illustrative procedures.

Ethyl 2-propyl-3-butyl-3-oxo-propionate

A mechanically stirred suspension of sodium hydride (16.2 g of 60% dispersion in mineral oil) in 400 mL of anhydrous toluene was treated dropwise with ethyl pentanoate (50.0 g) at room temperature under nitrogen atmosphere. Upon completion of the addition, the reaction mixture was refluxed for 5 h and then cooled to room temperature, quenched by pouring onto a mixture of ice and 10% aqueous hydrochloric acid, and extracted with chloroform. The combined organic phases were washed with aqueous solution of potassium bicarbonate, then with water, dried over magnesium sulfate, filtered, concentrated on a rotary evaporator, and distilled in vacuum to give 32.0 g (79%) of the title compound.

Ethyl 2-butyl-2-cyclopentyl-3-methyl-3-oxo-propionate

A mechanically stirred suspension of sodium hydride (4.00 g of 60% dispersion in mineral oil) in anhydrous N,N-dimethylformamide (DMF, 100 mL) was treated dropwise with a solution of ethyl 2-cyclopentyl-3-methyl-3-oxo-propionate (17.7 g) in DMF (50.0 mL) at room temperature under nitrogen atmosphere. Stirring of the reaction mixture was continued at this temperature until the formation of hydrogen ended and the reaction mixture became transparent. After that the mixture was treated dropwise with a solution of 1-iodobutane (19.9 g) in DMF (50 mL) and stirred at room temperature overnight. The reaction mixture was then quenched by pouring onto a mixture of ice and 10% aqueous hydrochloric acid. The formed organic phase was separated and the aqueous phase was extracted with hexane. The combined organic phases were washed with brine, dried over magnesium sulfate, filtered, concentrated on a rotary evaporator, and distilled in vacuum to give 16.1 g (70%) of the title compound.

Ethyl 2-butyl-3-tert-butyl-3-oxo-propionate

A solution of diisopropylamine (22.5 mL) in anhydrous tetrahydrofuran (THF, 100 mL) was treated dropwise with 1.6 M solution of butyl lithium in hexane (100 mL) at 20° C. under nitrogen atmosphere, stirred at this temperature for additional 30 min, then cooled down to −70° C., and treated dropwise during 30 min with a solution of 1,3-dimethyl-3,4,5,6-tetrahydro-2(1H)-pyrimidinone (DMPU, 18.6 g) and ethyl hexanoate (21.1 g) in THF (100 mL). Upon completion of the addition, the reaction mixture was stirred for 45 min at −70° C. and after that treated dropwise at the same temperature with a solution of 2,2-dimethyl-propionyl chloride (19.3 g) in THF (50 mL). The mixture was allowed to slowly warm-up to room temperature and stirred at this temperature overnight. Finally the reaction mixture was quenched by pouring onto a mixture of ice and 10% aqueous hydrochloric acid. The formed organic phase was separated and the aqueous phase was extracted with chloroform. The combined organic phases were thoroughly washed with brine to remove DMPU, dried over magnesium sulfate, filtered, concentrated on a rotary evaporator, and distilled in vacuum to give 21.0 g (63%) of the title compound.

Propylene Polymerization: General Procedure

A 4-liter autoclave was purged with a nitrogen flow at 70° C. for one hour and then charged at 30° C. under a propylene flow with 75 mL of anhydrous hexane containing 800 mg of AlEt$_3$, 79.8 mg of dicyclopentyldimethoxysilane and 10.0 mg of a solid catalyst component. The autoclave was closed. After that, 1.5 NL of hydrogen were added to the autoclave and then, under stirring, 1.2 Kg of liquid propylene were fed. The temperature was raised to 70° C. in five minutes and the polymerization was carried out at this temperature for two hours. The unreacted propylene was removed. The obtained polymer was recovered, dried at 70° C. under vacuum for three hours, weighted and then fractionated with o-xylene at 25° C. to determine the amount of the xylene insoluble fraction (X.I.).

Determination of X.I.

2.50 g of polymer were dissolved in 250 mL of o-xylene under stirring at 135° C. for 30 minutes. Then the solution was cooled to 25° C. and after 30 minutes the insoluble polymer fraction was filtered off. The resulting solution was evaporated in a nitrogen flow and the residue was dried and weighted to determine the percentage of soluble polymer and then, by difference, the xylene insoluble fraction (%).

Determination of Polydispersity Index (P.I.)

This property is strictly connected with the molecular weight distribution of the polymer under examination. In particular it is inversely proportional to the creep resistance of the polymer in the molten state. Said resistance, called modulus separation at low modulus value (500 Pa), was determined at a temperature of 200° C. by using a parallel plates rheometer model RMS-800 marketed by RHEOMETRICS (USA), operating at an oscillation frequency which increases from 0.1 rad/sec to 100 rad/sec. From the modulus separation value one can derive the P.I. by way of the equation:

$$P.I.=54.6*(\text{modulus separation})^{-1.76}$$

in which the modulus separation is defined as:

$$\text{modulus separation}=\text{frequency at } G'=500 \text{ Pa}/\text{frequency at } G''=500 \text{ Pa}$$

wherein G' is storage modulus and G" is the loss modulus.

EXAMPLES

Examples 1-10 and Comparative Example 11

Preparation of Solid Catalyst Components.

Into a 500 mL four-neck round flask, purged with nitrogen, 250 mL of TiCl$_4$ were introduced at 0° C. While stirring, 10.0 g of microspheroidal MgCl$_2$.2.8C$_2$H$_5$OH (prepared according to the method described in ex. 2 of U.S. Pat. No. 4,399,054 but operating at 3.000 rpm instead of 10.000) and 7.4 mMoles of β-keto-ester derivative were added. The temperature was raised to 100° C. and maintained for 120 min. Then the stirring was discontinued, the solid product was allowed to settle and the supernatant liquid was siphoned off.

250 mL of fresh TiCl$_4$ were added. The mixture was reacted at 120° C. for 60 min and then the supernatant liquid was siphoned off. The solid was washed six times with anhydrous hexane (6×100 mL) at 60° C. Finally, the solid was dried under vacuum and analyzed. The type and amount of β-keto-ester derivative (wt %) and the amount of Ti (wt %) contained in the solid catalyst component are reported in table 1. Polymerization results are reported in table 2.

TABLE 1

| Ex. | β-keto-ester derivative Type | Wt % | Ti Wt % |
|---|---|---|---|
| 1 | ethyl 2,2-di-ethyl-3-ethyl-3-oxo-propionate | 13.7 | 3.0 |
| 2 | ethyl 2-butyl-2-cyclopentyl-3-methyl-3-oxo-propionate | 15.0 | 2.5 |
| 3 | ethyl 2,2-di-isobutyl-3-methyl-3-oxo-propionate | 14.3 | 3.3 |
| 4 | ethyl 2,2-di-ethyl-3-isobutyl-3-oxo-propionate | 10.7 | 3.0 |
| 5 | ethyl 2,2-di-ethyl-3-cyclohexyl-3-oxo-propionate | 10.8 | 3.0 |
| 6 | ethyl 2-butyl-3-tert-butyl-3-oxo-propionate | 6.1 | 3.2 |
| 7 | ethyl 2-(cyclohexyl-methyl)-3-tert-butyl-3-oxo-propionate | 7.1 | 3.2 |
| 8 | ethyl 2-isopropyl-3-tert-butyl-3-oxo-propionate | 8.7 | 3.0 |
| 9 | ethyl 2,2-penta-methylene-3-tert-butyl-3-oxo-propionate | 7.3 | 2.9 |
| 10 | ethyl 1,3,3-tri-methyl-2-oxo-cyclohexanoate | 6.7 | 4.8 |
| Comp. 11 | ethyl 2-methyl-4-methyl-4-oxo-butanoate | 2.9 | 3.1 |

TABLE 2

| Example | Yield KgPP/gCat | X.I. Wt % | PI |
|---|---|---|---|
| 1 | 42.7 | 97.6 | 4.6 |
| 2 | 38.7 | 96.7 | 4.3 |
| 3 | 52.1 | 96.3 | 4.5 |
| 4 | 42.3 | 96.8 | 4.8 |
| 5 | 40.0 | 96.8 | 4.8 |
| 6 | 61.7 | 96.9 | 4.3 |
| 7 | 44.2 | 96.2 | nd |
| 8 | 43.8 | 97.4 | 3.7 |
| 9 | 48.7 | 96.3 | 4.4 |
| 10 | 54.0 | 96.5 | 4.4 |
| Comp. 11 | 8.0 | 90.9 | nd |

The invention claimed is:

1. A solid catalyst component for polymerizing olefins comprising Mg, Ti, halogen and an electron donor selected from β-keto-ester derivatives of formula (I)

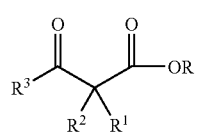

(I)

wherein R and R$^3$ are, same or different, a C1-C20 hydrocarbon group optionally comprising at least one heteroatom, R$^1$ and R$^2$ are H or a C1-C20 hydrocarbon group optionally comprising at least one heteroatom, with the proviso that $R^1$ and $R^2$ are not contemporaneously hydrogen, and two or more of $R-R^3$ can be linked to form a cycle.

2. The solid catalyst component according to claim 1 in which R is a primary alkyl comprising from 1 to 15 carbon atoms.

3. The solid catalyst component according to claim 1 in which one of $R^1$ and $R^2$ is hydrogen.

4. The solid catalyst component according to claim 1 in which both $R^1$ and $R^2$ are hydrocarbon groups.

5. The solid catalyst component according to claim 1 in which $R^1$ is selected from linear or branched, primary, secondary or tertiary alkyl groups.

6. The solid catalyst component according to claim 1 in which $R^2$ is selected from hydrogen, or linear or branched, primary, secondary or tertiary alkyl groups.

7. The solid catalyst component according to claim 1 in which $R^3$ is selected from aryl, or linear or branched, primary, secondary or tertiary alkyl groups.

8. The solid catalyst component according to claim 1 comprising at least one titanium compound comprising at least one Ti-halogen bond, and wherein the β-keto-ester derivatives of formula (I) are supported on a Mg halide in active form.

9. The solid catalyst component according to claim 8 in which the titanium compound is $TiCl_4$ or $TiCl_3$.

10. A catalyst for polymerizing olefins comprising a product of a reaction between:
a solid catalyst component comprising Mg, Ti, halogen and an electron donor selected from β-keto-ester derivatives of formula (I)

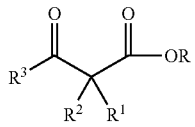
(I)

wherein R and $R^3$ are, same or different, a C1-C20 hydrocarbon group optionally comprising at least one heteroatom, $R^1$ and $R^2$ are H or a C1-C20 hydrocarbon group optionally comprising at least one heteroatom, with the proviso that $R^1$ and $R^2$ are not contemporaneously hydrogen, and two or more of $R-R^3$ can be linked to form a cycle;
an alkylaluminum compound; and
optionally, at least one electron-donor compound.

11. The catalyst according to claim 10, wherein the electron-donor compound is an external donor.

12. The catalyst according to claim 10 in which the alkylaluminum compound is a trialkylaluminum compound.

13. The catalyst according to claim 11 in which the external donor is a silicon compound of formula $R_a^5 R_b^6 Si(OR7)_c$,
where a and b are integer from 0 to 2;
c is an integer from 1 to 4 and (a+b+c) is 4; and
$R^5$, $R^6$ and $R^7$ are, same or different, a $C_1$-$C_{18}$ alkyl radical, a $C_1$-$c_{18}$ cycloalkyl radical, or a $C_1$-$C_{18}$ aryl radical, wherein at least one of $R^5$, $R^6$, and $R^7$ optionally comprise at least one heteroatom.

14. A process for (co)polymerizing olefins carried out in presence of a catalyst comprising a product of a reaction between:
a solid catalyst component comprising Mg, Ti, halogen and an electron donor selected from β-keto-ester derivatives of formula (I)

(I)

wherein R and $R^3$ are, same or different, a C1-C20 hydrocarbon group optionally comprising at least one heteroatom, $R^1$ and $R^2$ are H or a C1-C20 hydrocarbon group optionally comprising at least one heteroatom, with the proviso that $R^1$ and $R^2$ are not contemporaneously hydrogen, and two or more of $R-R^3$ can be linked to form a cycle;
an alkylaluminum compound; and
optionally, at least one electron-donor compound.

* * * * *